United States Patent
Egetoft

(10) Patent No.: US 9,098,613 B2
(45) Date of Patent: Aug. 4, 2015

(54) LOGGING OF APPLICATION MESSAGES

(75) Inventor: Karsten Egetoft, Wiesloch (DE)

(73) Assignee: SAP SE, Walldorf (DE)

( * ) Notice: Subject to any disclaimer, the term of this patent is extended or adjusted under 35 U.S.C. 154(b) by 1909 days.

(21) Appl. No.: 11/474,004

(22) Filed: Jun. 23, 2006

(65) Prior Publication Data

US 2007/0299849 A1    Dec. 27, 2007

(51) Int. Cl.
G06F 9/44    (2006.01)
G06F 9/46    (2006.01)
G06F 3/00    (2006.01)
G06F 13/00   (2006.01)
G06F 11/34   (2006.01)

(52) U.S. Cl.
CPC ........ *G06F 11/3476* (2013.01); *G06F 2201/80* (2013.01); *G06F 2201/835* (2013.01); *G06F 2201/865* (2013.01); *G06F 2201/87* (2013.01)

(58) Field of Classification Search
CPC .......... G06F 11/3476; G06F 2201/865; G06F 2201/835; G06F 2201/87; G06F 2201/80
See application file for complete search history.

(56) References Cited

U.S. PATENT DOCUMENTS

| 6,519,576 B1* | 2/2003 | Freeman .................. 706/21 |
| 6,591,228 B1* | 7/2003 | Hall et al. .................. 702/187 |
| 6,769,079 B1* | 7/2004 | Currey et al. .................. 714/45 |
| 2002/0091944 A1* | 7/2002 | Anderson et al. ............. 713/201 |
| 2002/0194245 A1* | 12/2002 | Simpson et al. ............. 709/101 |
| 2004/0254919 A1* | 12/2004 | Giuseppini .................. 707/3 |
| 2007/0174844 A1* | 7/2007 | Adams et al. ................ 719/318 |

OTHER PUBLICATIONS

Andrei Malicinski, Scott Dominick, Tom Hartrick, Measuring Web traffic, Mar. 1, 2001, IBM Technical Library, http://www.ibm.com/developerworks/web/library/wa-mwt1/ and https://www.ibm.com/developerworks/web/library/wa-mwt2/.*
Defintion of Session ID, Jan. 20, 2006, http://searchsoftwarequality.techtarget.com/sDefinition/0,,sid92_gci1158582,00.html.*
AWStats logfile analyzer 6.4 Documentation; AWStats Documentation—Other tools; archived Mar. 3, 2005; retrieved Nov. 15, 2010; 4 pages.*

* cited by examiner

*Primary Examiner* — H S Sough
*Assistant Examiner* — Kimberly Jordan
(74) *Attorney, Agent, or Firm* — Kenyon & Kenyon LLP

(57) ABSTRACT

The processing application includes numerous jobs for performing processing operations on computing objects. Whereas previous systems log job information on a per job basis, the apparatus and method includes generating application messages. These application messages are generated based on events in the operation of the application and the messages include predefined event information. The application messages are processing and filtered by a central logging device, which may be in response to customization properties. From this central logging device the filtered messages are centrally stored in an application log database, thereby providing a central depository and formatting of previously incongruent job-specific logging data.

20 Claims, 4 Drawing Sheets

PROCESS LOG
130

| OBJECT ID | PROCESS STEP | MSG CLASS | MSG NO. | TEXT | TIME STAMP |
|---|---|---|---|---|---|
| A | STEP 1 | I | 001 | OBJECT RECEIVED | 28.03.2006 13:01:01 |
| A | STEP 1 | I | 002 | OBJECT VALIDATED | 28.03.2006 13:01:30 |
| B | STEP 1 | E | 007 | OBJECT COULD NOT BE VALIDATED DUE TO MISSING HEADER | 28.03.2006 13:01:45 |
| B | STEP 1 | E | 008 | OBJECT PROCESSING DATE IS MISSING | 28.03.2006 13:02:01 |
| C | STEP 1 | I | 001 | OBJECT RECEIVED | 28.03.2006 13:03:11 |
| C | STEP 1 | I | 002 | OBJECT VALIDATED | 28.03.2006 13:03:15 |

FIG. 3

OBJECT LOG
140

| OBJECT ID | PROCESS STEP | MSG CLASS | MSG NO. | TEXT | TIME STAMP |
|---|---|---|---|---|---|
| A | STEP 1 | I | 001 | OBJECT RECEIVED | 28.03.2006 13:01:01 |
| A | STEP 1 | I | 002 | OBJECT VALIDATED | 28.03.2006 13:01:30 |
| A | STEP 2 | I | 001 | PROCESSING STARTED | 28.03.2006 13:01:45 |
| A | STEP 3 | W | 004 | OBJECT WAITING FOR MANUAL RELEASE | 28.03.2006 13:02:01 |
| A | STEP 4 | I | 001 | OBJECT RELEASED | 28.03.2006 13:03:11 |
| A | STEP 5 | I | 001 | OBJECT PROCESSED | 28.03.2006 13:03:15 |
| A | STEP N | I | 001 | ... | 28.03.2006 13:03:45 |
| A | STEP N | I | 002 | ... | 28.03.2006 13:04:12 |
| A | STEP N | I | 003 | ... | 28.03.2006 13:04:32 |

FIG. 4

LOGGING OF APPLICATION MESSAGES

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to the logging of processing operations performed on one or more processing objects and more specifically to logging and centrally storing log messages associated with these operations across a multi-operation processing application.

Computer applications that process large volumes of transactional data are often designed according to a defined business process that comprises any number of multiple process steps. The objects to be processed in the application are processed in various steps. Within each step, different events can be logged in a job log in order to document the processing operations. Within each step, typically one or more events are tracked in an application.

In existing processing environments, applications compile and maintain operation logs individual to specific tasks or jobs. These logs including information relating to various processing steps for that job. For example, in a payment processing application, a first portion of the application may include receiving an initial electronic payment. The application may log the initial receipt of this electronic payment.

As the application executes additional steps in the processing operations, different steps are individually logged as they occur in different processing jobs. Logging various operations is very well known and commonly found in many processing operations. This logging technique allows additional levels of redundancy and security, by denoting when various operations occur. These logs can provide feedback information, for example indicating how many objects are processed in a set period of time.

High volume processing computer applications that are processing millions of transactions (objects) are often designed in a way that the single process steps are controlled by a central job-control mechanism. Within each job that is launched from the job-control, one or more process steps are processed for multiple objects.

Although, the existing systems are restricted by the per-job nature of the logs. As it currently stands, each different job in the processing application generates its individual log. This is due, in part, to the general nature of the applications themselves. In order to optimize the overall performance of the application, one or more steps are processed for multiple objects through a job control application that triggers batch jobs that execute the various steps. Often each of these jobs is divided into several work processes running in parallel in order to maximize the overall performance of the application and the number of objects that can be processed on the given hardware platform.

When multiple separate jobs process multiple objects through multiple process steps, the logging of messages or events within each process step is done in job-specific logs. These logs only document the messages or events that occur in the process steps performed by the specific job. This means that the logging of messages or events during the process is documented in multiple job logs.

These job logs have various problems and disadvantages. For one, each job log contains information on each object. If an object-orientated reporting of the information in the job logs is required, a user of the application must search in multiple logs in order to find the relevant information. An end-to-end event reporting for a specific object is extremely difficult due to the singular nature of the logs. Another problem is that the various job logs are typically not standardized regarding the logged content. This makes the complexity of the analysis of the different logs even higher. Additionally, the decision on which events or messages are to be stored in the database must be made at each job's runtime. For high-volume processing applications, the logging of messages or events is performance-critical, such that only the absolute necessary events or messages are to be stored within the log.

Therefore, the existing system uses a multi-step processing application having various jobs, where each job logs its specific job messages. This per job logging limits these existing systems from benefits of analyzing logging information across different jobs within the application itself as well as complicates the logging of the proper information.

BRIEF DESCRIPTION OF THE DRAWINGS

FIG. 3 illustrates a graphical representation of one embodiment of a process log;

FIG. 4 illustrates a graphical representation of one embodiment of an object log;

DETAILED DESCRIPTION

An application may include any number of specific processing jobs pertaining to various operations. Based on the scope of the application, the processing jobs may range in size and importance, as well as when and where these processing jobs are executed. The processing jobs can be responsible for specific executable tasks and are performed in one or more different sequences depending on the executable goal for a computing object. The computing object may be a data object or other identifier that is processed by the application.

As the different jobs are being executed in the application, the jobs generate application messages instead of the previously generated job messages. These application messages may include varying formatting of information and are provided to a central logging device. Through the logging device, all or selected application messages are logged and subsequently stored in a database. This technique, including the application messages that are originally generated by the different processing jobs, allow for a central storage and subsequent access of logging information for the application as a whole.

Figure 1:
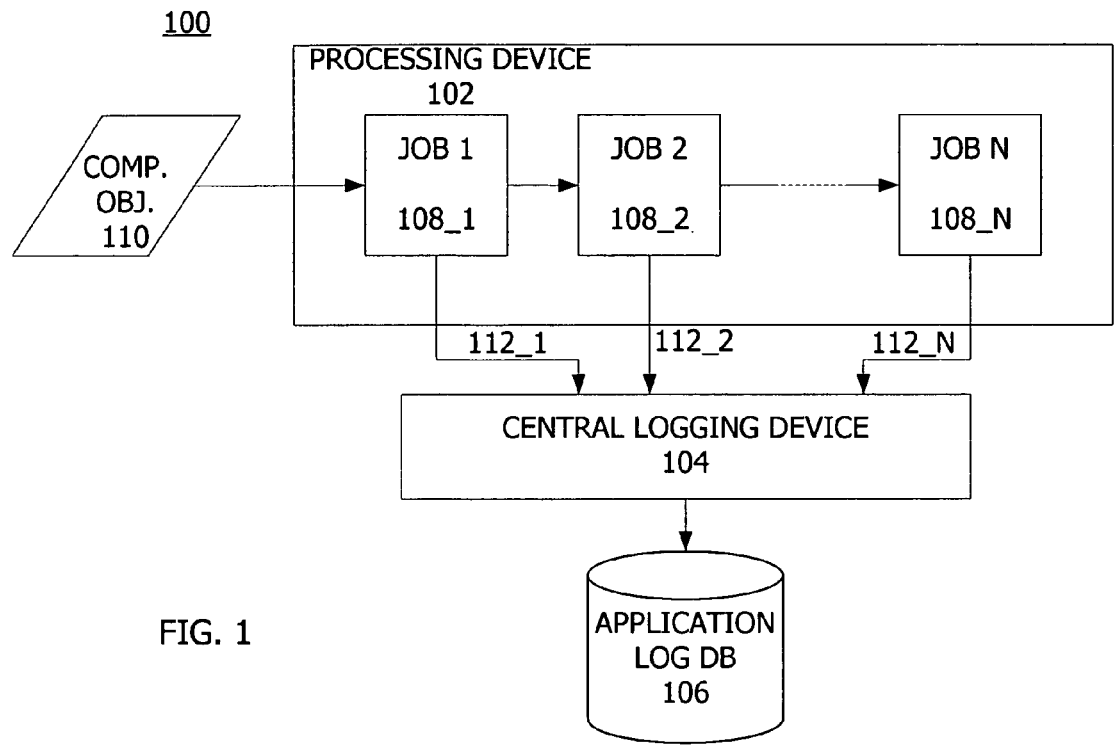
FIG. 1 illustrates a block diagram of one embodiment of an apparatus for logging application messages.

FIG. 1 illustrates one embodiment of an apparatus 100 including a processing device 102, a central logging device 104 and an application log database 106. The processing device 102 includes processing jobs 108_1, 108_2, and 108_N, where N is any suitable integer value (collectively referred to as 108).

The processing device 102 may be one or more processing elements operative to perform various processing operations. The processing device 102 may be implemented in hardware, software or a combination thereof. Additionally, the processing device 102 may be centrally disposed in a single computing platform or may be distributed across various processing platforms, such as in a networked processing environment. Similar to the processing device 102, the jobs 108 may be implemented in hardware, software or a combination thereof. In one embodiment, the jobs 108 include designated executable instructions that when read by a processing device, such device 102, the device performs instructed operations. These jobs 108 may be performed in the central processing platform or across a networked operation.

The central logging device 104 may be implemented in hardware, software of a combination thereof and provides for collecting and processing application messages generated by the different jobs 108. As described in further detail below, the central logging device 104 may include various levels of functionality for performing requested operations on the application messages. The application log database 106 may be any suitable type of storage location capable of receiving and storing data from the central logging device 104. The application log database 106 may also allow for different levels of data access such that data may be acquired and analyzed therefrom.

In the embodiment of FIG. 1, the processing device 102 receives a computing object 110. The computing object 110 may be a data structure including information that is usable by the processing device. For example, the processing device 102 may execute different jobs associated with financial applications, so the computing object 110 may be a data structure relating to a financial transaction, such as a payment order with information such as amount, date and time, signatures, authorization factors, etc. Additionally, it is recognized that the computing object 110 may be any other suitable item, including such as a pointer or reference to information securely stored outside of the processing device itself, for example.

In the embodiment of the FIG. 1, upon receipt of the object 110, the processing device 102 performs different jobs 108. Based on the intended processing purpose of the object 110, different jobs 108 may be accessed. For example, some jobs 108 may be omitted as unnecessary to the intended processing goal. The application may include a varying sequence of different jobs to provide the intended data processing operations.

In the processing device 102, each of these jobs 108 perform one or more operations to succeed an overall processing objective. For example, a first job 108_1 may be to verify that the party requesting a particular financial transaction is authorized to make such a request. As the jobs 108 perform different operations, these jobs 108 generate application messages 112_1, 112_2, and 112_N, collectively referred to as 112. Unlike previous job messages that are generated in a job-specific format and stored in a job-specific log, the application messages allow for further levels of processing operations.

In the embodiment of FIG. 1, the central logging device 104 receives the application messages 112. The central logging device 104, as described in further detail below, can perform various processing operations to filter or otherwise customize the application messages. Selected application messages, which may include additional customized information, may then be stored in the application log database 106 in a structured way. Instead of this job-related information being independent to each job and individually stored in separate job logs, the database 106 centrally stores this uniform information relating the different jobs performed or computed with the computing object 110.

Figure 2:
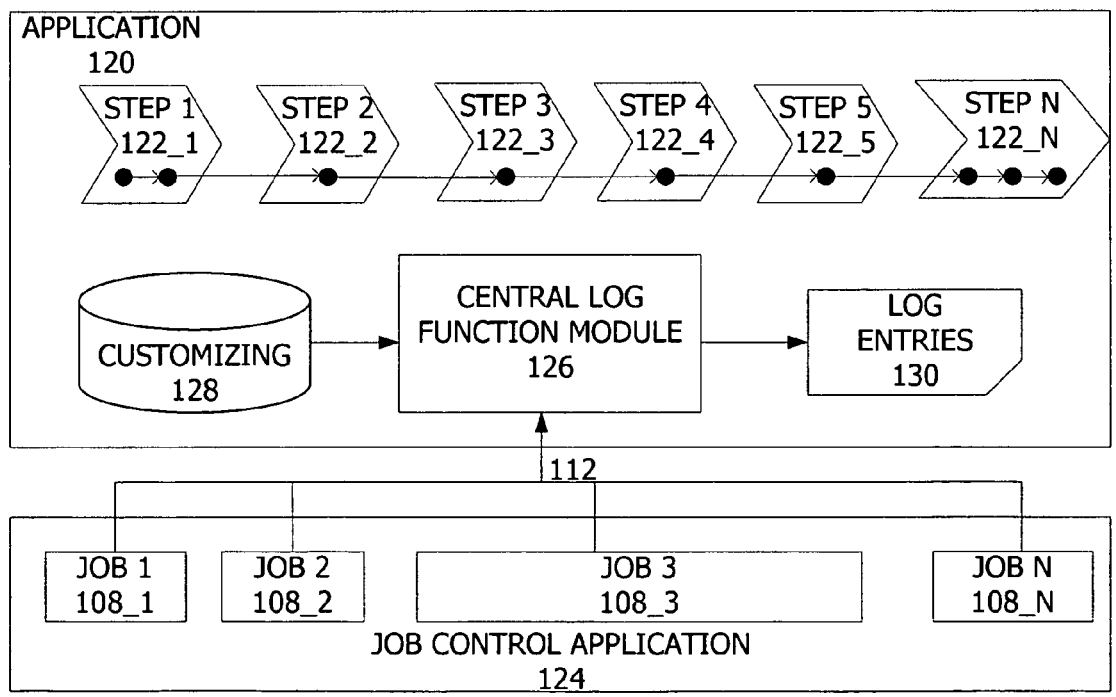
FIG. 2 illustrates a graphical illustration of the operation of an application including the logging of application messages.

FIG. 2 illustrates a graphical representation of the operation of an application 120, which may be running on the processing device 102 of FIG. 1. The application 120 includes the processing steps collectively referred to as 122, where M is any suitable integer value.

In addition to the application, a processing device (such as the processing device 102 of FIG. 1) executes a job control application 124 including the jobs 108. As illustrated in FIG. 2, the application 120 includes a central log function module 126, a customizing database 128 and log entries 130. With reference to FIG. 1, the central log functioning module 126 may include executable instructions performed by the central logging device 104 and the log entries 130 may be centrally stored in the application log database 106.

In one embodiment of operation, as the application 120 advances through various steps 122, corresponding jobs 108 are performed. As described above with respect to FIG. 1, these jobs 108 generate application messages 112. The central log function module 126 receives these messages 112 and generates log entries 130 based on customizing parameters 128, as described in further detail below.

The central application log (106 of FIG. 1) offers an infrastructure to capture and/or trace application messages, which can be any suitable type of message or event notification. This includes, among other actions, saving, deleting, reading and/or displaying logs. Each job 108 does not create its own job log, but rather triggers the entries to be logged through the central log function module 126.

The central log function module 126 offers advantages, such as cross component or processing step uniform logging functionality, standardized access to logs and standardized content in the log. For example, the log entries may be filtered to a standard formatting, thereby allowing the standardized access for reading and displaying information. In another embodiment, the entries may also be sortable based on the filtering criteria, thereby allowing more directed reading and displaying of information. The standardized log content also makes it possible to analyze and report operations on the full log.

In one embodiment, log entries are initially collected during runtime by the central log functioning module 126 in a memory (not shown) associated with the application 120. This may improve system performance by reducing computation loads at execution time and minimize the number of input and output data accesses to the application log database 106. In this embodiment, the physical writing of the logs can be done at a later time, a commit time, when it is computationally more convenient. In another embodiment, the processing, filtering, sorting and storage may be done during runtime operations.

The logging of the information in the database 106 may be process oriented and/or object oriented. In various embodiments, the central log function module 126 in the application 120 supports both process oriented logging and object oriented logging. The process oriented logging of application messages includes logging activities inside the application on a process step level along with the computing object. The object-oriented logging includes the logging of all activities, such as historical information, of a particular computing object during its life-cycle inside the application.

FIG. 3 illustrates one embodiment a sample process log 130 including the logged application messages of a process-oriented logging operation. This sample log includes 6 categories of an object identifier, processing step, message class, message number, text and a time stamp. The identified object is the computing object 110 (of FIG. 1) and the step may refer to the steps 122 (of FIG. 2).

Some of the category items may be provided from the customizing database 128. For example, message classes may be defined, for example in the financial application, S may indicate a success class, I indicates an information class, W indicates a warning class and E indicates an error class. The customized identifiers can then be used by the central function log module 126 to filter the relevant category of application messages that should be logged.

Additionally, the customization database 128 may also include predetermined categories of messages associated with various factors. This can provide consistency in the logged entries. For example, the categories may include predetermined text based on a processing step, such as if the message is in step 1, message number 1 may be assigned to the text "object received." Other examples exist, such as illustrated in the log 130, such as step 1, message number 2, "object validated" and step 1, message number 8, "object processing date is missing" which is also classified as an error message.

Based on this customization, messages are sent to the central application log with different parameters, such as for example with reference to the sample log 130 of FIG. 3, an object identifier, process step number, message class and the message number. Whenever an appropriate event occurs within the application, each job thereupon triggers a message to be sent to the central log function module and thereupon logged in the database 106 if the single message is not filtered out by the central log function module. These messages may include specific information usable by the module in processing and/or filtering the application message.

In the object oriented logging embodiment, it is possible to report end-to-end history of a specific object. FIG. 4 illustrates a sample object log 140. This log 140, similar to the log 130, includes sample categories and corresponding customized data, which may be indicated by the customizing database 128. This embodiment uses the standardized content in the application log to make reports that can answer object-oriented queries. For example, the object log may be able to show all events for a particular computing object 110 or show all messages for the computing object for a particular processing step. In another example, the object log allows for the calculation of an average processing time between different events, such as using the timestamps. It is recognized that there any number of suitable queries that may take advantage of the logged information covering the various steps of the computing object as it is processed in the application.

Referring back to FIG. 2, through the customization database 128, the central log function module 126 may further reduce computation requirements and logging activities by applying one or more filters on the application messages 112. This filtering may be performed during a runtime operation and may include instructions for various process steps and classes. For example, the instructions may indicate showing particular process steps having the corresponding message class and indicate not showing other messages. Other filtering techniques may be readily implemented, for example such as logging all messages assigned to a particular message class.

Figure 5:
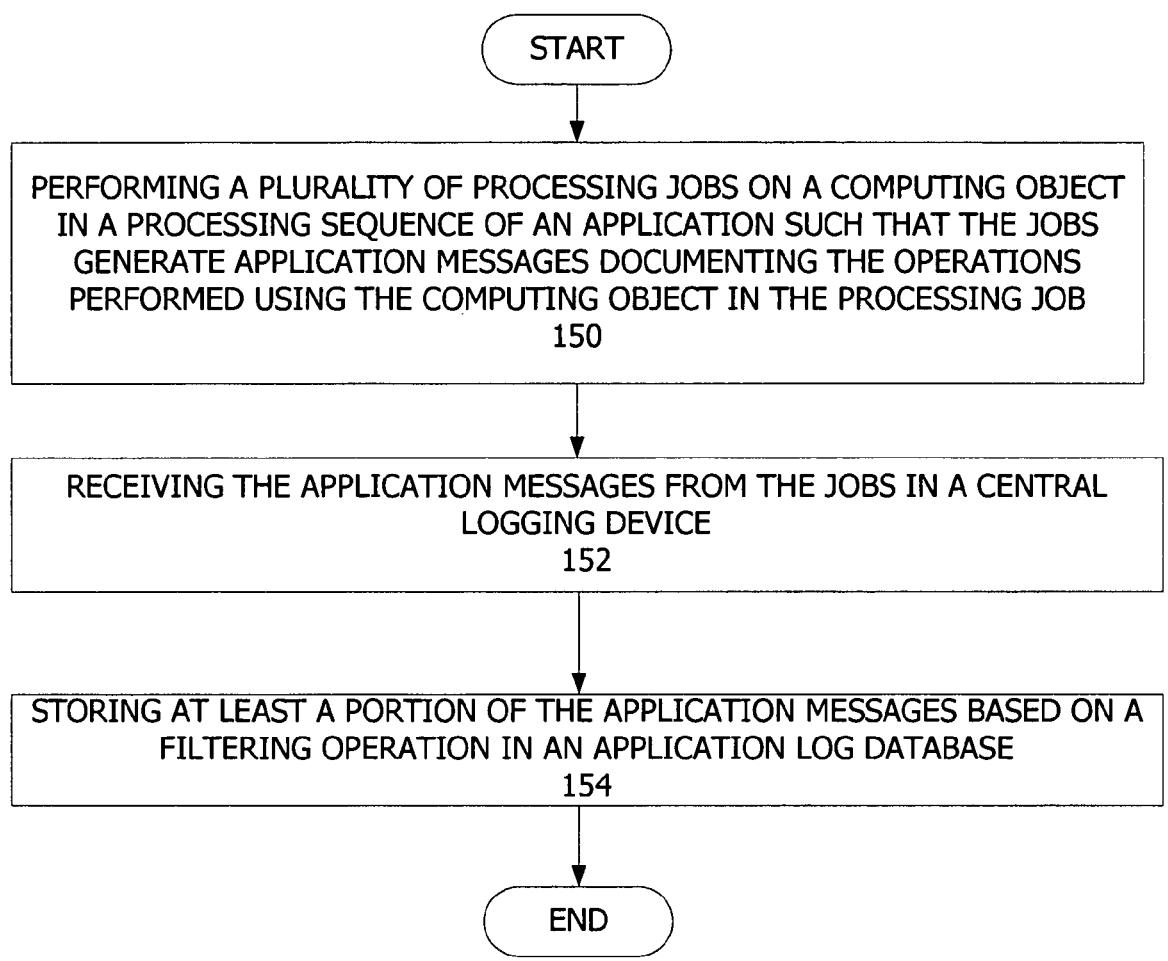
FIG. 5 illustrates a flowchart of the steps of one embodiment of a method for logging application messages.

FIG. 5 illustrates a flowchart of the steps of one embodiment of a method for application messages. In this embodiment, the method begins, step 150, by performing a plurality of processing jobs on a computing object in a processing sequence of an application, such that the jobs generate application messages relating to the operations performed using the computing object in the processing job. As described above, this step may be performed by the processing device 102 of FIG. 1 executing various steps 122 of the application 120 of FIG. 2. The jobs 108 thereupon generate the application messages 112 relating to the operations or events being performed with the computing object 110.

In this embodiment, the next step, step 152, is receiving the application messages from the jobs in a central logging device. This step may include the application messages 112 being provided by the job control application 124 to the control log function module 126 of FIG. 2 or from the jobs 108 in the processing device 102 to the logging device 104 of FIG. 1. As described above, the central log function module 126 and the central logging device 104 may perform filtering operations. In one embodiment, the filter may be based on filter parameters from the customizing database 128.

Thereupon, the next step in this embodiment, step 154, is storing at least a portion of the application messages in an application log database, where the at least a portion is determined by the filter operations. Thereupon, in this embodiment, the method for logging application messages is complete.

Additional embodiments may further include, generating, using the job control application 124, application messages 112 for the different jobs 108 such that the job control application 124 identifies the application messages 112 that are to be stored in the application log database 106 through the central logging device 104. Another embodiment may include the central logging device 104 storing the application messages 112 in an application memory (not shown) during application 120 run time and then storing the selected application messages to the application log database 106 during a commit time.

Figure 6:
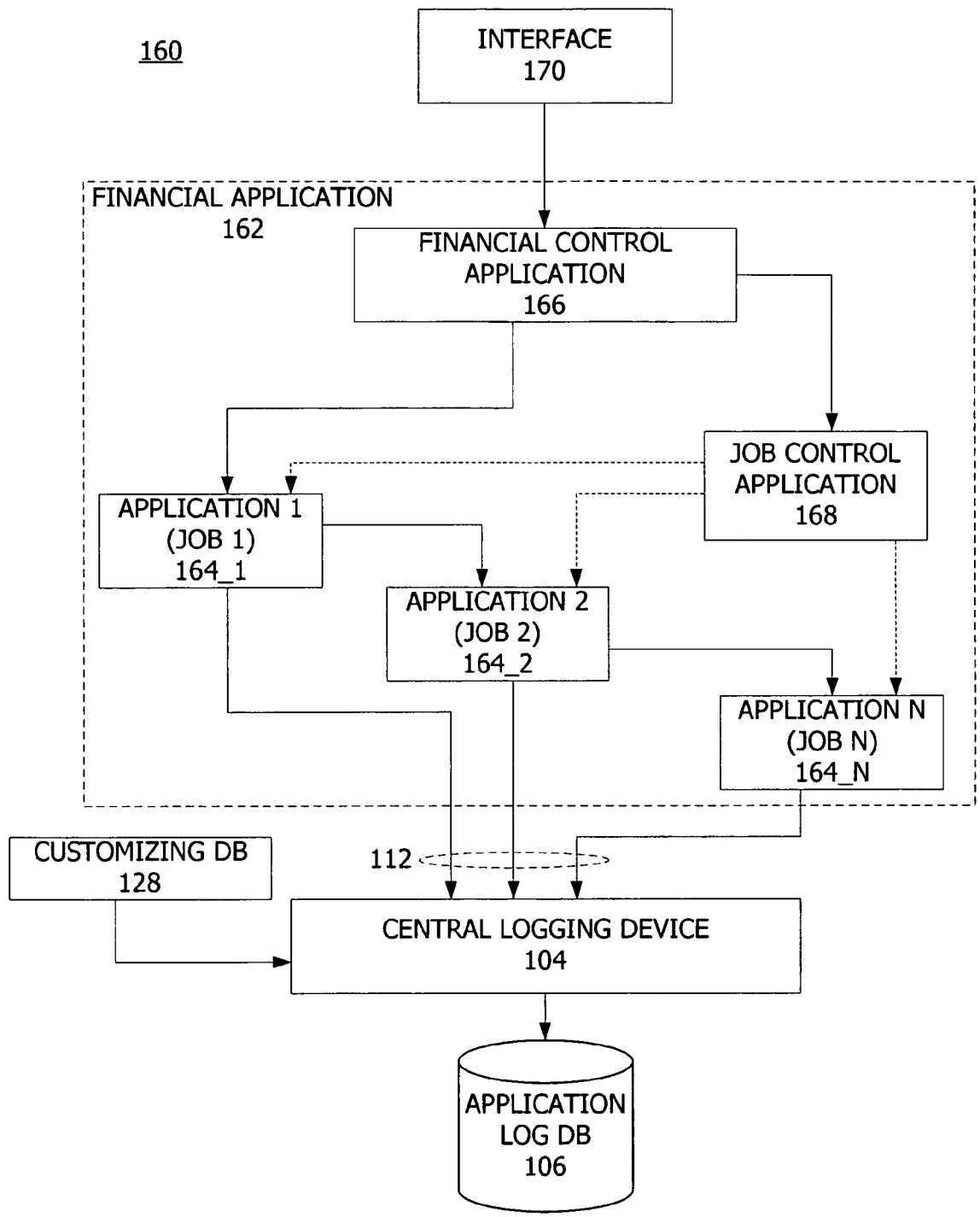
FIG. 6 illustrates a block diagram of one embodiment of a system for logging application messages.

FIG. 6 illustrates one embodiment of a processing system for logging application messages relating to a financial application. As mentioned above, the financial services industry includes various applications and processing systems performing different processing tasks. In the financial services industry, tracking these operations is very important for numerous reasons, including accounting and regulatory requirements. With all the different numerous tasks and the typical high volume processing operations, FIG. 6 illustrates a system 160 including a financial application 162. The application 162 relates to financial services, such as receiving and processing payments and credits, invoicing operations, accounting operations or any other suitable financial related operation.

The financial application includes different applications for performing specific tasks or operations associated with the financial application 162, the applications referred to in the similar nomenclature of jobs, collectively referenced as jobs 164. In one embodiment, the financial application 162 also includes a financial control application 166 and a job control application 168. The system 160 further includes an interface 170, the central logging device 104, the customizing device 128 and the application log database 106.

The application 162, including the control application 166, the job applications 164 and the job control application 168 typically consist of executable instructions executed on one or more processing devices. Although, it is recognized that these applications may be designed in hardware or a combination of hardware and software encoding. It is also recognized that the applications may be centrally executed in a single processing environment or may be executed across numerous processing devices or systems, such as in a networked environment.

In one embodiment of operation, the interface 170, which may be a user portal or other type of input device, receives information that can be used in the computing object. For example, the interface may be accounting software were a user enters information to transfer money between different accounts. The information received in the interface is provided to the financial control application 166 for conducting, or at least attempting to conduct, the requested transaction. Information associated with requested transaction may be the computing object, which in one embodiment may include assigning the object an identifier, such as illustrated in the sample logs 130 and 140 of FIGS. 3 and 4.

In one embodiment, the financial control application 166 designates specific applications or jobs 164 that are to be executed to perform the requested operation. The control application 166 provides the computing object to the first job 164_1, with additional processing information as needed or controlled by additional computation aspects to the financial application 162 or a processing system. For example, if the financial application 162 is spread across different processing environments, the control application 166 may include routing information or security information, as needed.

As illustrated in FIG. 6, the financial control application 166 is in communication with the job control application 168, similar to the job control application 124. Although, in this embodiment, the job control application 168 is illustrated as separate from the jobs 164, whereas in the embodiment described above, the job control application 124 is embedded directly with the jobs 108 of FIG. 2. In this embodiment, the job control application 168 may also be across a networked connection or similarly directed associated with the jobs 164, similar to the above-described embodiment.

The job control application 168 is operative to generate the application messages 112 for the different processing jobs 164. Similar to the above-described embodiments, the messages 112 are received in the central logging device 104. Based on customization information from the customizing database 128, one or more different types of filtering or other operations may be performed to generate the log entries (such as entries 130 of FIG. 2), such that at least a portion of the received application messages are stored in the application log database.

In addition to possibly being in a networked environment, the system 160 of FIG. 6 allows for the logging of application messages relating to financial applications 162. These applications can handle very large volumes of processing operations and include a significant volume of processing steps. Based on the sensitive nature of the data and transactions in the financial application 162, the application message logging provides the system-wide logging of information, with numerous advantages on data and system analysis, compared with the previous incompatible job-specific logs.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for logging application messages from a financial application comprising:
    a computing object including a data structure relating to a financial transaction;
    a hardware processing device performing a plurality of processing jobs on the computing object within the financial application in a predetermined order to complete the financial transaction, at least two of the processing jobs generating application messages in distinct formats that document operations performed on the computing object by each respective processing job;
    a central logging device filtering the generated application messages to identify those application messages to be logged, and generating a log entry in a common format for each identified application message, the filtering supporting, in accordance with an accounting requirement of the financial transaction, both process oriented logging and object oriented logging of each generated application message, wherein:
        the process oriented logging includes logging activities inside the application on a process step level, wherein the activities include events associated with the computing object and at least one other computing object;
        the object oriented logging includes exclusively logging events associated with the computing object during the life cycle of the computing object in the application; and
    an application log database logging each generated log entry in the common format.

2. The apparatus of claim 1 wherein the application includes a plurality of processing steps with each job performing at least one of the processing steps and each application message relating to the at least one processing step.

3. The apparatus of claim 1 further comprising:
    a customizing device coupled to the central logging device, the customizing device enabling a selection of either process oriented logging or object oriented logging for each application.

4. The apparatus of claim 1 wherein the central logging device is operative to store the application messages in an application memory during application run time and then store at least a portion of the application messages during a commit time.

5. The apparatus of claim 1 wherein the application is a banking application and the processing jobs are directed to processing of financial transactions to the computing object in the banking application.

6. The apparatus of claim 1, wherein the filtering includes logging only process step application messages having an assigned message class, the assigned message class varying depending on whether a detected result of the corresponding process is a success class, an information class, a warning class, or an error class.

7. The apparatus of claim 1, wherein the filtering includes calculating an average processing time between different events from a comparison of timestamps in corresponding application messages.

8. The apparatus of claim 1, wherein the order in which the plurality of processing jobs is performed is defined by an executable goal for the computing object.

9. A method for logging application messages from a financial application comprising:
    processing, using a processing device, a plurality of processing jobs on a computing object in the financial application in a predetermined order to complete a financial transaction, wherein the computing object includes a data structure relating to the financial transaction;

monitoring the processing device during processing of the processing jobs;

generating application messages documenting operations performed using on the computing object in each respective processing job from the monitoring, at least two of the application messages generated in distinct formats;

filtering the generated application messages, in accordance with an accounting requirement of the financial transaction, to identify those application messages to be logged, the filtering supporting both process oriented logging and object oriented logging of each generated application message, wherein:

the process oriented logging includes logging activities inside the application on a process step level, wherein the activities include events associated with the computing object and at least one other computing object;

the object oriented logging includes exclusively logging events associated with the computing object during the life cycle of the computing object in the application; and generating a log entry in a common format for each identified application message.

10. The method of claim 9 wherein the application includes a plurality of processing steps with each job performing at least one of the processing steps and each application message relating to the at least one processing step.

11. The method of claim 9 further comprising:

generating, using a job control application, the application messages for the different processing jobs where the job control application identifies the application messages that are to be stored in the application log database.

12. The method of claim 9 further comprising:

providing filtering parameters including an object identifier, process step number, and message class to only include application messages matching the filtering parameters in the filtering.

13. The method of claim 9 wherein the application messages are stored in an application memory during application run time and then the at least a portion of the application messages are stored in the application log database during a commit time.

14. The method of claim 9 wherein the application is a banking application and the processing jobs are directed to processing of financial transactions to the computing object in the banking application.

15. The method of claim 9, wherein the filtering includes logging only process step application messages having an assigned message class, the assigned message class varying depending on whether a detected result of the corresponding process is a success class, an information class, a warning class, or an error class.

16. The method of claim 9, wherein the filtering includes calculating an average processing time between different events from a comparison of timestamps in corresponding application messages and the storing of application messages in the application log database is in an object orientated manner.

17. A processing system logging application messages relating to a financial application, the system comprising:

a computing object associated with a particular financial computing operation including an amount representing a quantitative valuation of the financial operation;

a hardware processing device performing a plurality of financial processing jobs on the computing object and within the financial application in a predetermined order to complete a financial transaction involving a transfer of the amount between accounts, at least two of the processing jobs generating application messages in distinct formats, each processing job independently generating respective application messages to comply with an accounting requirement;

a central logging device filtering the generated application messages to identify those application messages to be logged, and generating a log entry in a common format for each identified application message, the filtering supporting, in accordance with the accounting requirement, both process oriented logging and object oriented logging of each generated application message, wherein:

the process oriented logging includes logging activities inside the application on a process step level, wherein the activities include events associated with the computing object and at least one other computing object;

the object oriented logging includes exclusively logging events associated with the computing object during the life cycle of the computing object in the application; and an application log database logging each generated log entry in the common format.

18. The system of claim 17 wherein the application includes a plurality of processing steps with each job performing at least one of the processing steps and each application message relating to the at least one processing step.

19. The system of claim 18 further comprising:

a customizing device coupled to the central logging device, the customizing device enabling a selection of either process oriented logging or object oriented logging for each application.

20. The system of claim 17 wherein the central logging device stores the application messages in an application memory during application run time and then sends the at least a portion of the application messages to the application log database during a commit time.

* * * * *